United States Patent
Rabie et al.

(10) Patent No.: US 7,843,925 B2
(45) Date of Patent: *Nov. 30, 2010

(54) ETHERNET DIFFERENTIATED SERVICES ARCHITECTURE

(75) Inventors: Sameh Rabie, Kanata (CA); Osama Aboul-Magd, Kanata (CA); Bashar Abdullah, Kanta (CA); Baghdad Barka, Nepean (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 1486 days.

This patent is subject to a terminal disclaimer.

(21) Appl. No.: 10/868,607

(22) Filed: Jun. 15, 2004

(65) Prior Publication Data

US 2005/0157721 A1    Jul. 21, 2005

Related U.S. Application Data

(60) Provisional application No. 60/537,487, filed on Jan. 20, 2004.

(51) Int. Cl.
*H04L 12/56* (2006.01)
*H04L 12/28* (2006.01)

(52) U.S. Cl. .................................. 370/392; 370/393

(58) Field of Classification Search .............. 370/392, 370/351, 360, 230, 395, 416, 400, 401, 389, 370/235, 256, 263, 252, 254, 465, 393; 709/250, 709/230, 251, 406, 238, 224, 235, 239, 245, 709/228; 706/41; 712/10, 234

See application file for complete search history.

(56) References Cited

U.S. PATENT DOCUMENTS

| | | | |
|---|---|---|---|
| 6,185,203 B1 * | 2/2001 | Berman | 370/351 |
| 6,577,642 B1 * | 6/2003 | Fijolek et al. | 370/465 |
| 6,611,522 B1 | 8/2003 | Zheng et al. | |
| 6,647,428 B1 * | 11/2003 | Bannai et al. | 709/245 |
| 6,711,614 B1 * | 3/2004 | Suzuki | 709/224 |
| 6,798,775 B1 * | 9/2004 | Bordonaro et al. | 370/392 |
| 6,839,327 B1 * | 1/2005 | Zavalkovsky et al. | 370/252 |
| 6,912,225 B1 | 6/2005 | Kohzuki et al. | |
| 7,050,396 B1 * | 5/2006 | Cohen et al. | 370/235 |
| 7,180,860 B2 * | 2/2007 | Fonden et al. | 370/235 |
| 7,184,413 B2 * | 2/2007 | Beyer et al. | 370/254 |
| 7,277,442 B1 | 10/2007 | Holmgren et al. | |
| 7,366,168 B2 * | 4/2008 | Hughes et al. | 370/389 |
| 2002/0031142 A1 * | 3/2002 | Metin et al. | 370/463 |
| 2002/0176450 A1 | 11/2002 | Kong et al. | |
| 2003/0031182 A1 | 2/2003 | O'Neil et al. | |
| 2003/0048791 A1 | 3/2003 | De Cnodder et al. | |
| 2003/0053464 A1 | 3/2003 | Chen et al. | |
| 2003/0067934 A1 | 4/2003 | Hooper et al. | |

(Continued)

*Primary Examiner*—Pankaj Kumar
*Assistant Examiner*—Prenell P Jones
(74) *Attorney, Agent, or Firm*—Christopher & Weisberg, P.A.

(57) ABSTRACT

A network includes an edge node configured to define per hop behaviors using a set of bits in an Ethernet header of a frame and a core node configured to receive the frame and to forward the frame according to the per-hop-behaviors. The network can also include a defined set of differentiated service classes, each differentiated service class associated with the set of per hop behaviors, indicated in the set of priority bits. The network classifies the Ethernet frame based on at least one of a set of priority bits or information in at least one protocol layer in the frame header of the Ethernet frame and determines a per hop behavior based on the classification.

39 Claims, 9 Drawing Sheets

U.S. PATENT DOCUMENTS

| | | |
|---|---|---|
| 2003/0076838 A1 | 4/2003 | Shaio et al. |
| 2003/0099237 A1* | 5/2003 | Mitra et al. ................. 370/393 |
| 2003/0103503 A1* | 6/2003 | Dubuc et al. ................. 370/392 |
| 2003/0118026 A1* | 6/2003 | Kuhl et al. ............. 370/395.21 |
| 2003/0126286 A1 | 7/2003 | Lee et al. |
| 2004/0022255 A1 | 2/2004 | Chen et al. |
| 2004/0252717 A1 | 12/2004 | Solomon et al. |
| 2005/0141509 A1 | 6/2005 | Rabie et al. |
| 2005/0157645 A1* | 7/2005 | Rabie et al. ................. 370/230 |
| 2005/0157729 A1 | 7/2005 | Rabie et al. |
| 2005/0157737 A1* | 7/2005 | Rabie et al. ................. 370/416 |

* cited by examiner

| p-bits | Nodal Behavior | |
|---|---|---|
| 111 | E-EF | 120 |
| 110 | E-AF22 | 122 |
| 101 | E-AF21 | 124 |
| 100 | E-AF12 | 126 |
| 011 | E-AF11 | 128 |
| 010 | E-DF | 130 |
| 001 | Reserved for congestion indication in the backward or forward directions | 132 |
| 000 | | 134 |

FIG. 7

ETHERNET DIFFERENTIATED SERVICES ARCHITECTURE

PRIOR APPLICATIONS

This application claims the benefit of U.S. Provisional Patent Application entitled "ETHERNET DIFFERENTIATED SERVICES" Ser. No. 60/537,487 filed on Jan. 20, 2004

BACKGROUND

This invention relates to quality of service support in Ethernet networks.

Ethernet is a widely installed local area network (LAN) technology. Ethernet technology can be cost effective, easy to configure, and is widely understood by network managers. Ethernet technology is increasingly being deployed in service provider metro and wide-area networks. Success of Ethernet in provider networks depends on the ability to provide service level agreements (SLAs) that can guarantee bandwidth, delay, loss, and jitter requirements to end-users. Service providers can offer multiple services with different quality-of-service (QoS) characteristics and performance guarantees.

The base Ethernet technology is specified in the IEEE 802.3 standard. Traditionally, Ethernet did not include QoS capabilities. More recently, the IEEE has introduced the user priority capability that enables the definition of up to eight classes of service (CoS). The user priority capability is often referred to as "the p-bits." The p-bits are carried in the 802.1Q tag and are intended for use to identify different service classes.

An Ethernet network may include multiple customer edge (CE) devices, switches, and routers. These devices may communicate using the Ethernet protocols and/or other networking technologies and protocols.

SUMMARY

In one aspect, a system includes an Ethernet network. The Ethernet network includes a set of edge nodes configured to define per hop behaviors using a set of p-bits in the Ethernet header and a set of core nodes configured to forward the frame according to the per-hop-behaviors as indicated in the p-bits.

In another aspect, a network includes a first Ethernet network and a second Ethernet network. The first Ethernet network includes an edge node configured to define per hop behaviors using a set of bits in an Ethernet header of a frame and a core node configured to receive the frame and to forward the frame according to the per-hop-behaviors as indicated in the set of bits. The second network includes a second edge device in the second network configured to determine the Ethernet per-hop behavior for the frame.

Embodiments may include one or more of the following. The set of edge nodes can provide conditioning of the frames. The set of core nodes can forward the frame according to the per hop behaviors indicated in the p-bits. The set of edge nodes can include an ingress device and an egress device.

The edge node can include a classifier device, a marker device configured to mark the frame with a particular per-hop-behavior indicated in the p-bits, and a shaper. Alternately, the edge node can include a classifier device, a marker device configured to mark the frame with a particular per-hop-behavior indicated in the p-bits, and a dropper. The edge node can also include a meter device.

The set of core nodes can forward the frame according to a subset of all per-hop-behaviors. The set of edge nodes can add a tunnel header to the frame. The tunnel header can include a set of bits that indicate a per hop behavior. The tunnel header can use a Q-in-Q or MAC-in-MAC Ethernet Encapsulation method. The system can preserve the information in the original frame.

The system can also include boundary nodes between the multiple Ethernet domains. The boundary nodes can map a per hop behavior of the frame between the multiple networks. The boundary nodes can provide traffic conditioning for the frame. The system can also include customer edge device that sets the p-bits for the frame.

In another aspect, a system includes an Ethernet network. The Ethernet network includes a set of edge nodes configured to define Ethernet per hop behaviors using a set of bits in a frame and a set of core nodes configured to forward the frame according to the Ethernet per-hop-behaviors, the core nodes using a different network technology than the edge nodes.

Embodiments can include one or more of the following. The different network technology can be an asynchronous transfer mode technology, a multi-protocol label switching technology, a frame relay technology, or an Internet protocol technology. The set of edge nodes can map the Ethernet per hop behaviors to a set of bits in a frame according to the different network technology. The set of edge nodes can map the Ethernet per hop behaviors to a set of connections in the different network technology. The system can preserve a set of information in the frame. The set of edge nodes can encapsulate the frame and tunnel the frame for delivery on the core nodes.

In another aspect, a networking device includes a behavior aggregate classifier device configured to receive an Ethernet frame and classify the frame based on the priority bits in the Ethernet header.

Embodiments can include one or more of the following. The device can determine a bandwidth profile based on the classification. A meter device can meter the frames based on the bandwidth profile. A marker device can mark the frame header with a particular per-hop-behavior indication. A shaper device can receive a frame from the marker and determine a behavior based on the per hop behavior. The marker can set the priority bits in the frame to a particular combination.

The system can also include a frame meter device. The frame meter device can determine temporal properties of a set of frames. The shaper device can be a dropper and the dropper can drop the frame based on the per hop behavior.

The networking device can include core switch configured to receive a frame from an ingress switch or another core switch. The core switch can apply a particular forwarding behavior to the frame based on the per hop behavior as indicated in the priority bits. The networking device can include an egress switch configured to receive a frame from the ingress or the core switch. The ingress switch can include an encapsulation device and the core switch is one of an asynchronous transfer mode switch, a multi-protocol label switching switch, a frame relay switch, or an Internet protocol router.

The above aspects or other aspects of the invention may provide one or more of the following advantages.

Aspects may provide a scalable Ethernet differentiated services architecture that is capable of supporting different services and performance characteristics. The architecture can accommodate a wide variety of services and provisioning policies. The Ethernet differentiated services architecture can allow for incremental deployment, and permitting interoperability with non-Ethernet differentiated services compliant network nodes.

A variation of the architecture where Ethernet is used at the access and a different technology at the network core provides an advantage of allowing differentiated services across heterogeneous networks.

Ethernet differentiated services domains are multiple enterprise and/or provider networks/segments that employ different Ethernet differentiated services methods and policies within each domain, such as different p-bits interpretations, number/type of PHBs, etc. Mapping or traffic conditioning can be used at the boundary nodes between different domains.

Ethernet class of service (CoS) bits identifies nodal behavior (e.g., how an incoming frame should be handled at queuing and scheduling levels based on p-bits encoding) and allows frames to be forwarded according to the specified nodal behaviors. Ethernet per-hop-behaviors are determined or encoded by a specific assignment of the p-bits. The p-bits can also include congestion information to indicate network congestion.

The particular use of the 802.1Q VLAN Tag Control Information (e.g., p-bits) enables the introduction of the differentiated services to Ethernet technologies. The use of the p-bits allows the definition of a number of defined per hop behaviors (PHBs) that determine the forwarding treatment of the Ethernet frames throughout the network.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 7 is table of priority bit assignments.

DETAILED DESCRIPTION

Figure 1:
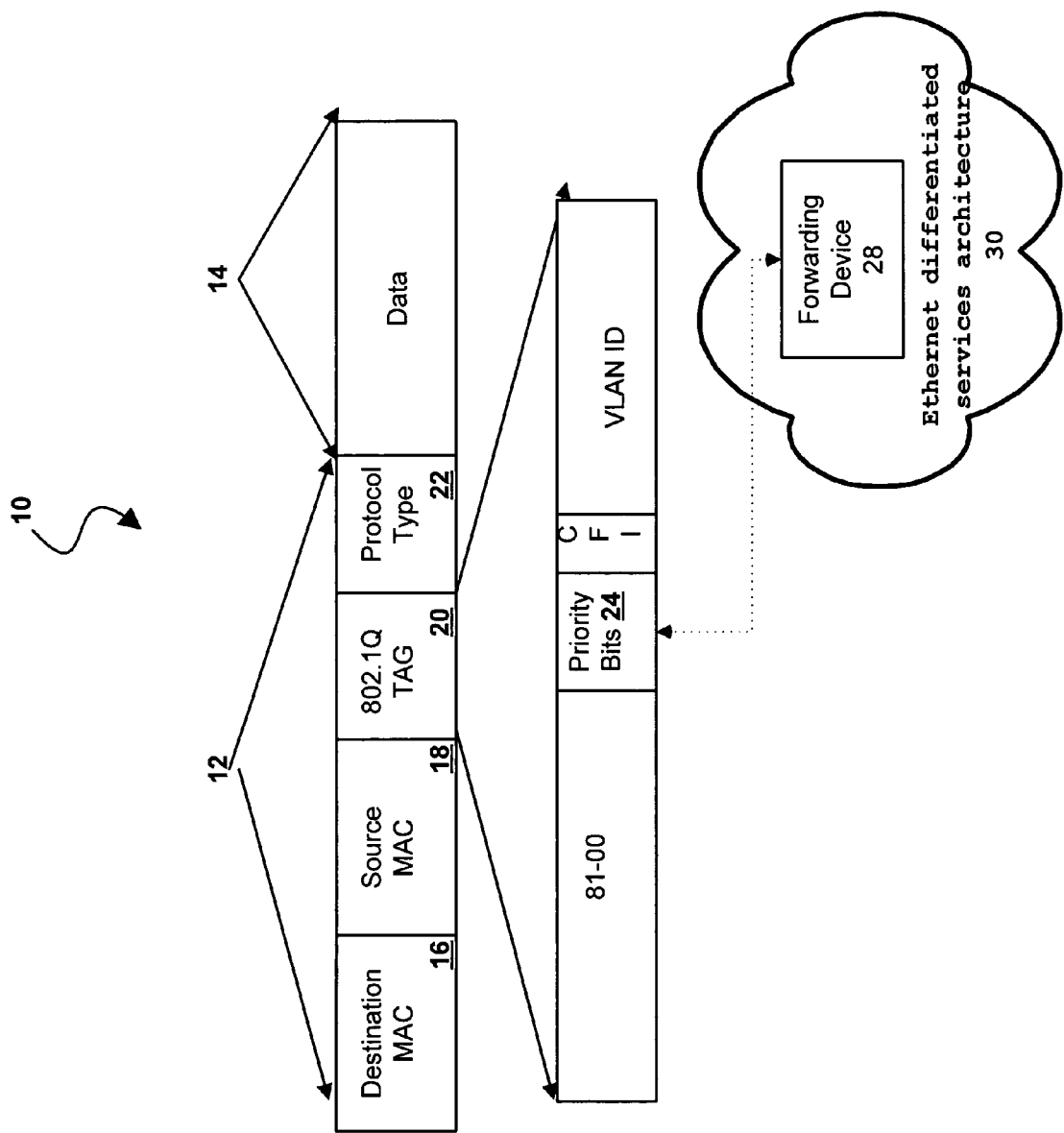
FIG. 1 is a block diagram of a tagged Ethernet frame.

Referring to FIG. 1, an example of an Ethernet frame 10 is shown. The frame includes a header portion 12 and a data portion 14. The header 12 includes a: destination address 16, a source address 18, an 802.1Q tag 20, and a protocol type 22. The Institute for Electrical Engineers (IEEE) standard 802.1Q describes the 802.1Q tag 20. The 802.1Q tag in an Ethernet frame defines a virtual-LAN (VLAN) membership. Three bits of this tag, referred to as the priority bits 24, identify user priority. The three priority bits 24 provide eight combinations and describe up to eight levels of service. The three priority bits can be used to describe the per-hop behavior of a frame. Per-hop-behaviors include for example, externally observable forwarding behavior applied to a frame by a frame forwarding device 28 in an Ethernet differentiated services architecture 30.

Figure 2:
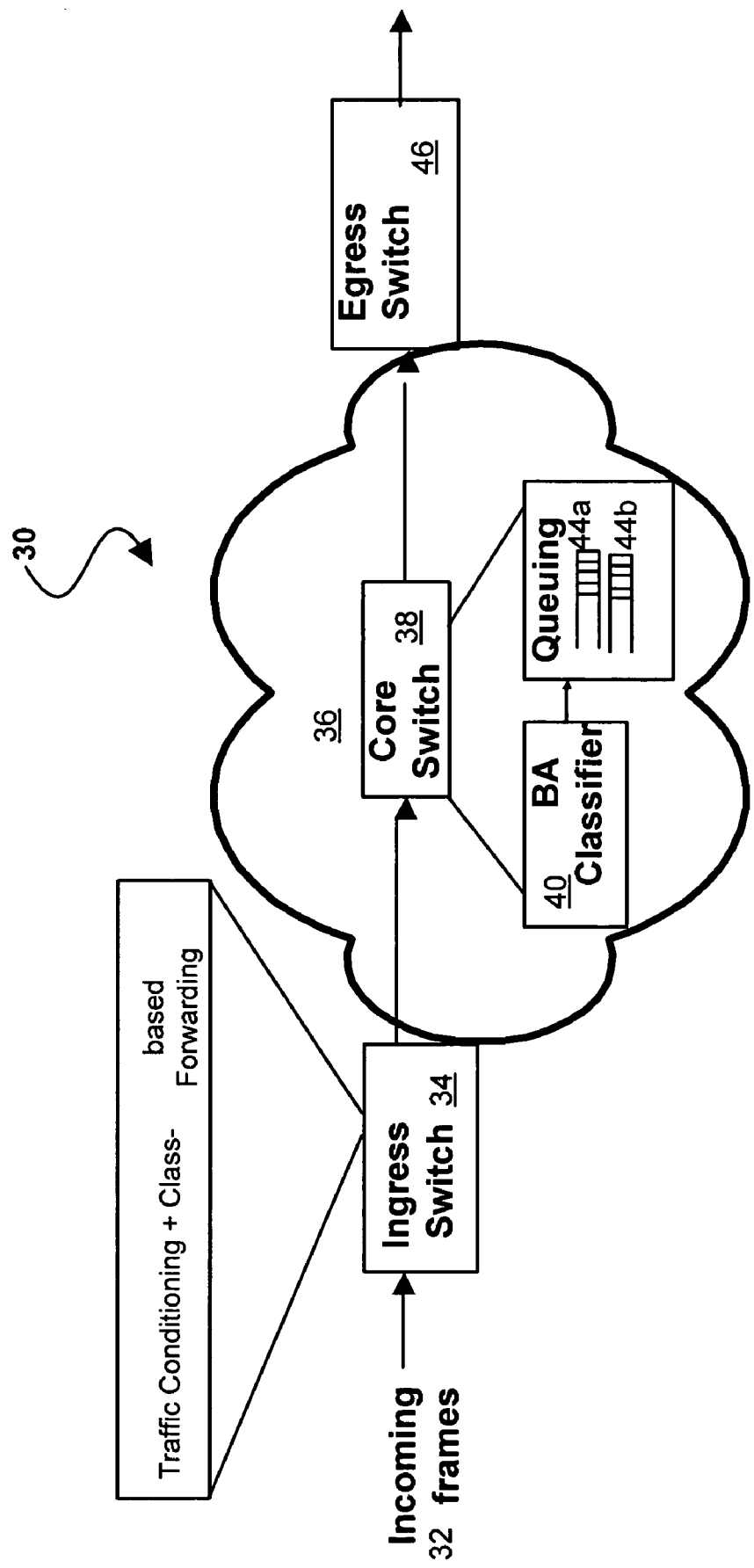
FIG. 2 is a block diagram of an Ethernet differentiated services architecture.

Referring to FIG. 2, the Ethernet differentiated services architecture 30 is shown. This architecture 30 forwards frames based on the per-hop-behaviors defined by the p-bits 24 for the frames. One embodiment of the architecture 30 includes a frame forwarding device 28 that includes an ingress switch 34, a core switch 38, and egress switch 46. The ingress switch 34 performs traffic conditioning functions and class-based forwarding functions. The core switch 38 includes a behavior aggregate (BA) classifier 40 and a class-based egress scheduler that uses multiple queues 44. The egress switch 46 may perform similar functions to either the ingress switch 34 or core switch 38 (or a subset of those functions), depending on network configurations and policies. For example, if the egress switch 46 is connected to a customer edge node, the egress switch 46 can perform core node-like forwarding functions. Alternately, if the egress switch 46 is connected to another provider network using an network-network interface (NNI), the egress switch 46 Deforms traffic conditioning functions according to the service contract between the two providers. The architecture 30 includes Ethernet differentiated services functions implemented at both the edge and the network core 36, although other arrangements may be possible.

Unlike the IP DiffServ ("Differentiated services") Architecture, described in RFC 2475, the architecture 30 shown in FIG. 2 does not use the IP DSCP for indicating frame per-hop behaviors. Instead, the architecture 30 uses the Ethernet p-bits 24. Architecture 30 assumes that edge and core nodes are p-bit aware nodes, meaning that e.g., that the nodes can set, clear and/or process frames based on the states of the p-bits. For example, all edge and core nodes are VLAN-aware Ethernet nodes that can set and/or interpret the p-bits. The network core 36 may be an Ethernet network such as is common in enterprise networks or a provider metro Ethernet network, and may use some Ethernet tunneling/aggregation techniques such as stacked virtual large area networks (VLAN) support such as Q-in-Q (referring to the 802.1Q tag), Media access control in media access control (MAC-in-MAC, or an equivalent scheme.

The architecture 30 separates edge and network core node functions. That is, the edge includes traffic conditioning that may include multi-field classification, metering, and marking of the Per-Hop Behavior (PHB) in the p-bits 24, together with class-based forwarding. On the other hand the edge functions may occur at the user-network interface (UNI) for example, between the customer edge (CE) node and service provider, or at the network-network interface (NNI) between networks/domains. The core node 36 is scalable and performs simple behavior and aggregate classification based on the frame per-hop-behavior (PHB) (indicated in the p-bits 24), and class-based forwarding based on the PHB value.

Figure 3:
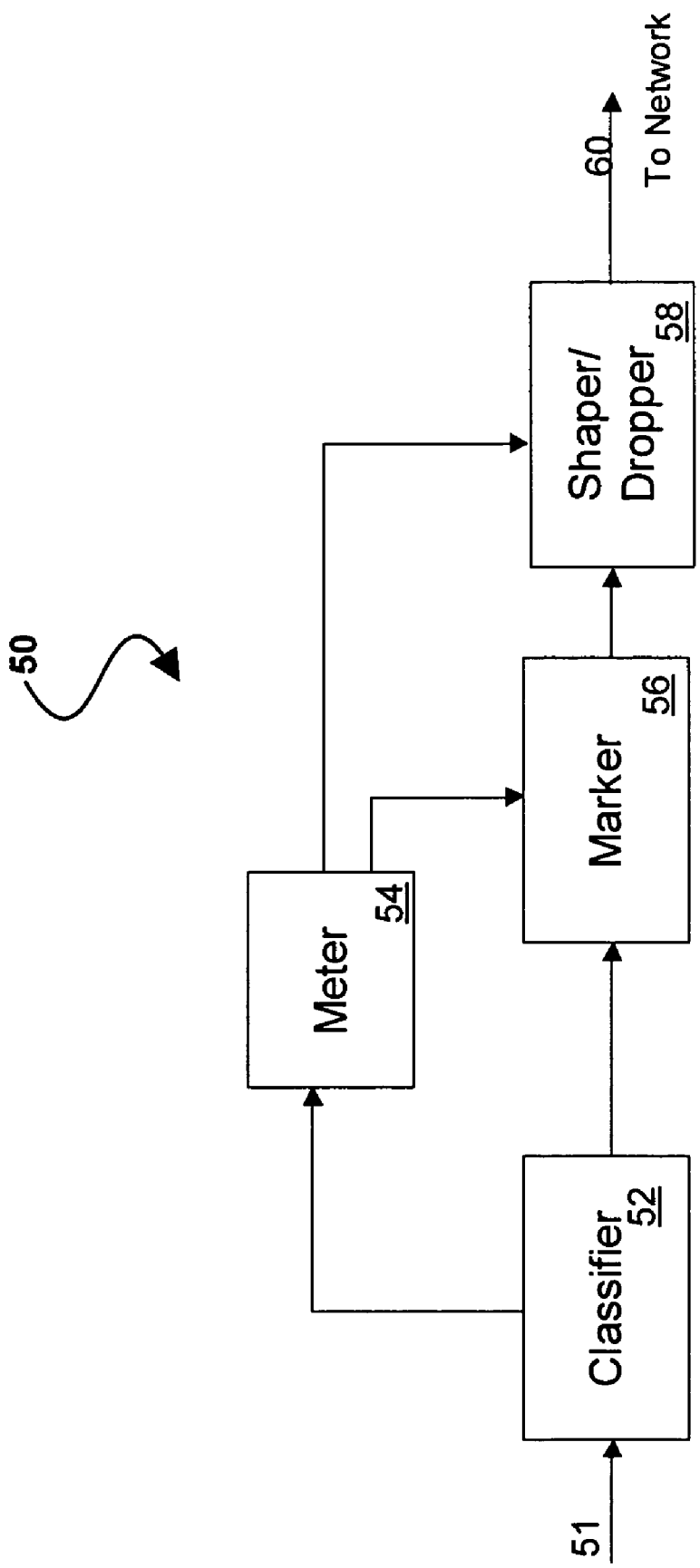
FIG. 3 is a block diagram of a set of components included in a device at an edge node of a network.

Referring to FIG. 3, components 50 included in a device at the network edge nodes are shown. For example, the set of components 50 are included in an ingress switch such as switch 34 (FIG. 2). The set of components 50 includes a classifier 52, meter 54, marker 56, and shaper/dropper 58. These components 50 perform Ethernet traffic conditioning functions at the network edge nodes to classify incoming traffic based on predetermined criteria.

The classification identifies flows and correlates the flows to corresponding bandwidth profiles for the flows and corresponding forwarding treatments defined or provided for the flows. The classifier 52 selects frames in a traffic stream based on content of some portion of the frame header (e.g., based on the p-bits). Two types of classifiers include behavior aggregate (BA) classifiers and multi-field (MF) classifiers. A BA classifier classifies frames based on the p-bits only. The MF classifier on the other hand selects frames based on the value of a combination of one or more header fields, such as source and destination address, p-bits, protocol ID, source and destination port numbers, and other information such as incoming interface/connection. In general, classifier 52 (e.g., a behavior aggregate (BA) classifier or multi-field (MF) classifier) is used to "steer" frames matching a rule to a different element of the traffic conditioner for further processing.

Frames enter classifier 52 (indicated by arrow 51) and may or may not be metered based on the service level agreement. Metered frames are passed to meter 54. Meter 54 measures the temporal properties of the stream of frames selected by a classifier and compares the properties to a traffic profile. A meter 54 passes state information to other components to trigger a particular action for each frame that is either in- or out-of-profile. Non-metered frames are passed from classifier 52 to marker 56.

Flows are marked (or remarked) by marker 56 to identify the Ethernet PHB applied to the incoming frame. For instance, frame marker 56 sets a particular field of a frame to a particular p-bit combination, adding the marked frame to a particular behavior aggregate. The marker 56 can be configured to mark all received frames to a single p-bit combination, or can be configured to mark a frame to one of a set of p-bit combinations used to select a particular PHB from a PHB group according to the state of the meter 54.

A PHB group is a set of one or more PHBs that can be specified and implemented simultaneously, due to a common constraint applying to all PHBs in the set such as a queue servicing or queue management policy. A PHB group allows a set of related forwarding behaviors to be specified together (e.g., four dropping priorities). A single PHB is a special case of a PHB group. When the marker 54 changes the p-bit combination in a frame it is referred to as having "re-marked" the frame.

Remarking may also occur across Ethernet-differentiated services domain boundaries, such as a user to network interface (UNI) or network to network interface (NNI) interface. Remarking could be used for such purposes as performing PHBs mapping or compression, or to effect p-bits translation.

If tunneling is used, the outer tunnel p-bits are usually also set to the desired PHB indication for forwarding through the aggregated core. The p-bits in the original Ethernet frame may be preserved through the network, or changed by the edge nodes.

Frames that exceed their assigned rates may be dropped, shaped, or remarked with a drop precedence indication. The shaper/dropper 58 shapes the traffic before sending the frames to the network as indicated by arrow 60. Shaper/dropper 58 discards some or all of the frames in a traffic stream in order to bring the stream into compliance with a traffic profile. This discarding is sometimes referred to as "policing" the stream. A dropper can be implemented as a special case of a shaper by setting the shaper buffer size to zero (or a few) frames.

In general, multi-field traffic classification is based on any of the L1-L7 protocol layer fields, either individually or in combination. Common L2 Ethernet fields used are the incoming Ethernet Interface (port), the Destination/Source MAC addresses, the virtual local area network identification (VLAN ID or VID), and the User Priority (p-bits). Based on the Destination/Source media access control (MAC) addresses all of the frames originating at a certain source and/or destined to a certain destination are assigned to the same flow. Thus, based on the VLAN ID all frames of a certain VLAN belong to the same flow.

Alternatively a Group of VLANs may be combined together for the purpose of class of service (CoS) functions. The user priority bits (p-bits 24) provide a finer granularity for flow identification.

The L2 Ethernet fields can be combined for traffic classification. Common combinations include: "port+p-bits", "VID(s)+p-bits." Common upper layer fields include IP differentiated services, IP source, IP Destination, IP Protocol Type, TCP port number, UDP port number.

Frame classification determines the forwarding treatment and metering of frames. Determining the forwarding treatment (e.g., congestion control, queuing and scheduling) by the edge nodes includes assigning PHBs to the group of frames that require the same treatment (e.g. Voice is assigned E-EF PHB, and Data is assigned E-AFX PHB). Metering can be used for determining and enforcing the bandwidth profile/traffic contract, and verifying the Service Level Agreements (SLAs), and allocating nodal resource to the flow.

The classification function may be different for the purpose of forwarding and metering. For example, voice and data typically receive different forwarding treatment, but their traffic bandwidth profile could be combined into a single traffic contract to resemble a leased line service.

Figure 4:
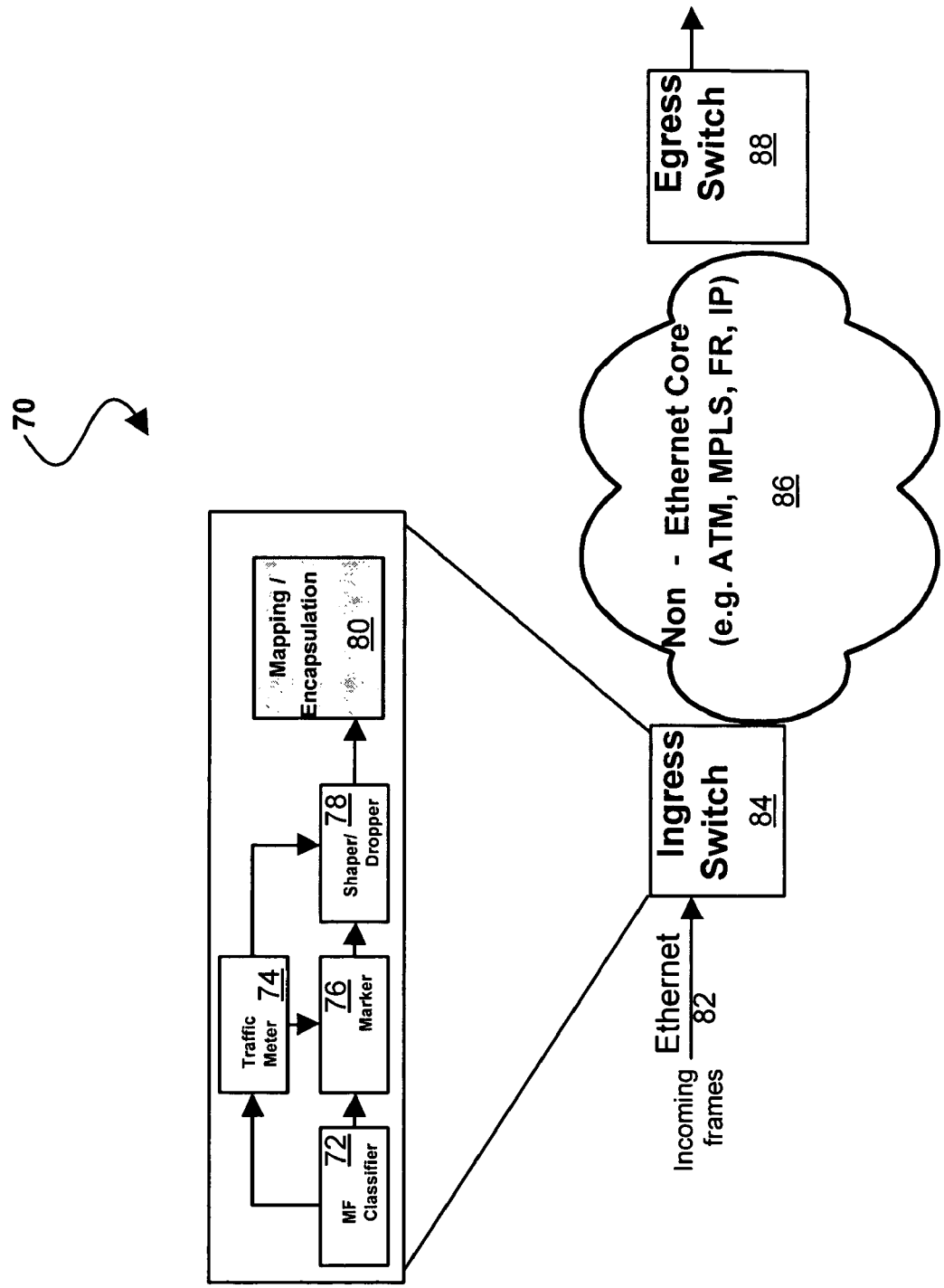
FIG. 4 is a block diagram of an Ethernet differentiated services architecture.
Figure 5:
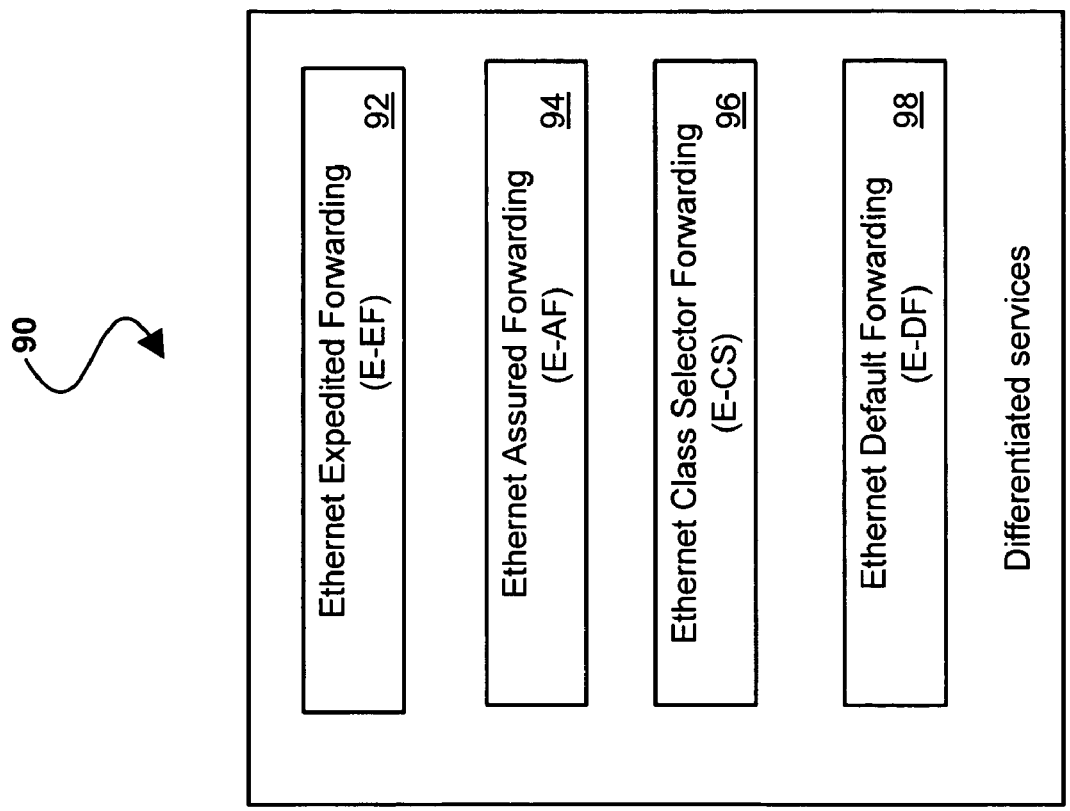
FIG. 5 is a block diagram of Ethernet differentiated services per hop behaviors.

Referring to FIG. 4, another example of an Ethernet differentiated services architecture 70 is shown. The architecture 70 includes an ingress switch 84 at an interface between an Ethernet network 82 and a non-Ethernet network core 86. The architecture 70 also includes an egress switch 88. In this example, different technologies are used for forwarding the Ethernet frames through the non-Ethernet network core 86. For example, the non-Ethernet network core 86 could use asynchronous transfer mode (ATM), multi-protocol label switching (MPLS), frame relay (FR), Internet protocol (IP), or other network protocols.

The ingress switch 84 includes a classifier 72, traffic meter 74, marker 76, shaper/dropper 78, and a mapping unit 80. The classifier 72, traffic meter 74, marker 76, and shaper/dropper 78 function in a similar manner to those described above in FIG. 3. The mapping unit 80 maps and encapsulates the Ethernet frames for forwarding on the core network 86.

The architecture 70 shown in FIG. 4 is similar to architecture 30 shown in FIG. 2, however, architecture 70 uses Ethernet at the access, and a different networking technology in the core 86. The edge conditioning functions are similar to the edge conditioning functions in architecture 30. The Edge node performs the class of service (CoS) mapping from the Ethernet PHB into the core network 86. Many mapping methods are possible such as mapping the PHB to an ATM virtual channel connection (VCC) (e.g., E-EF to constant bit rate (CBR) VCC), a link-state packet (LSP), an IP Differentiated services Core, etc. In all cases, the original information in the Ethernet frame is maintained through transport through the core using tunneling and/or encapsulation techniques.

In the above example, frames are placed into class queues based on the PHB. Alternately, frames could be placed on different logical or physical ports or connections with different levels of service based on the PHB.

In both architecture 30 (FIG. 2) and architecture 70 (FIG. 4) edge CoS functions define per-hop behaviors for a frame. However, in architecture 30, a frame is forwarded based on per-hop-behaviors indicated in the p-bits 24, whereas in architecture 70, a frame is forwarded based on the core network technology CoS transport mechanism.

Referring to FIG: 5, a grouping 90 of the nodal behaviors into, e.g., four categories is shown. The grouping 90 includes an Ethernet expedited forwarding category 92 (E-EF), Ethernet assured forwarding 94 (E-AF), Ethernet class selector 96

(E-CS), and Ethernet default-forwarding category 98 (E-DF). Other groupings of behaviors are possible.

The first category, referred to as an Ethernet expedited forwarding category 92 (E-EF) is primarily for traffic sensitive to delay and loss. This category is suitable for implementing services that require delivery of frames within tight delay and loss bounds and is characterized by a time constraint. A frame arriving to a network node and labeled as an Ethernet EF frame departs the node according to a time constraint (e.g., $d_k - a_k$ is less than or equal to $t_{max}$ where $a_k$ and $d_k$ are the arrival and the departure times of the $k_{th}$ frame to the node and $t_{max}$ is the time constraint). E-EF allows for frame loss when buffer capacity is exceeded, however, the probability of frame loss in this service is typically low (e.g., $10^{-5}$-$10^{-7}$). E-EF identifies a single drop precedence and frames that exceed a specified rate are dropped. For E-EF frames, no remarking (e.g., re-assigning the drop precedence of frame to a different value) is allowed. The Ethernet expedited forwarding category 92 does not allow re-ordering of frames.

A complete end-to-end user service can include edge rules or conditioning in addition to forwarding treatment according to the assigned PHB. For example, a "premium" service level (also be referred to as virtual leased line), uses E-EF PHB defined by a peak rate only. This "premium" service has low delay and small loss performance. A frame in the E-EF category can have forwarding treatment where the departure rate of the aggregate frames from a diff-serv node is set to equal or exceed a configurable rate. This rate is available independent of other traffic sharing the link. In addition, edge rules describe metering and peak rate shaping. For example, the metering/policing can enforce a peak rate and discard frames in excess of the peak rate. The metering/policing may not allow demotion or promotion. Peak rate shaping can smooth traffic to the network and convert traffic to constant rate arrival pattern. A combination of the forwarding behaviors and edge rules offer a "premium" service level. A premium service queue typically holds one frame or a few frames. An absolute priority scheduler increases the level of delay performance and could be offered initially on over-provisioning basis.

A second, more complex category, referred to as Ethernet assured forwarding (E-AF) 94 divides traffic into classes of service, and when the network is congested, frames can be discarded based on a drop precedence. More specifically, E-AF defines m (m>=1) classes with each class having n (n>1) drop precedence levels. Frames marked with high drop precedence indication are discarded before frames with a low drop precedence on nodal congestion. At the Ethernet traffic meter, E-AF frames that exceed their assigned rate may be marked with high drop precedence indication (instead of dropping). The network typically does not extend any performance assurances to E-AF frames that are marked with high drop precedence indication. The nodal discard algorithm treats all frames within the same class and with the same drop precedence level equally. E-AF per-hop-behavior does not allow re-ordering of frames that belong to the same flow and to the same E-AF class.

A third category, referred to as an Ethernet Class Selector (E-CS) 96 provides compatibility with legacy switches. Ethernet Class Selector includes up to eight p-bit combinations. For example, E-CS7 to E-CS0 with E-CS7 assigned the highest priority and E-CS0 assigned the lowest priority. E-CS frames can be metered at the network edge. E-CS does not allow significant re-ordering of frames that belong to the same CS class. For example, the node will attempt to deliver CS class frames in order, but does not guarantee that re-ordering will not occur, particularly under transient and fault conditions. All E-CS frames belonging to the same class are carried at the same drop precedence level.

The fourth category, a default-forwarding category 98 (E-DF), is suitable for implementing services with no performance guarantees. For example, this class can offer a "best-effort" type of service. E-DF frames can be metered at the network edge. This class of service should not allow (significant) re-ordering of E-DF frames that belong to the same flow and all E-DF frames are carried at the same drop precedence level.

Frame treatment can provide "differentiated services", for example, policing, marking, or re-coloring of p-bits, queuing, congestion control, scheduling, and shaping. While, the proposed Ethernet per hop behaviors (PHB) include expedited forwarding (E-EF), assured forwarding (E-AF), default forwarding (E-DE), and class selector (E-CS), additional custom per hop behaviors PHBs can be defined for a network. The three p-bits allow up to eight PHBs). If more PHBs are desired, multiple Ethernet connections (e.g. Ethernet interfaces or VLANs) can be used, each with up to eight additional PHBs. The mapping of the p-bits to PHBs may be signaled or configured for each interface/connection. Alternatively, in the network core, tunnels may be used for supporting a larger number of PHBs.

Figure 6:
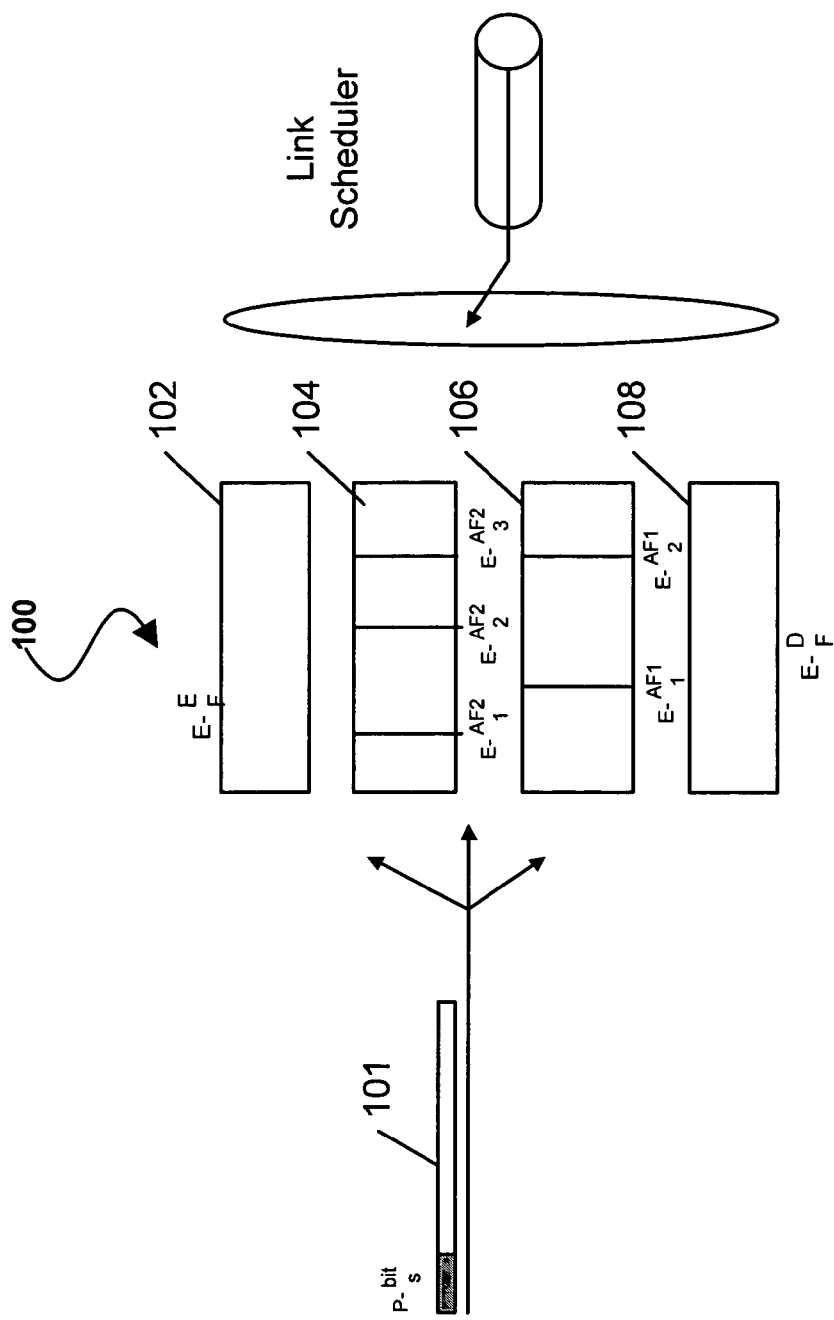
FIG. 6 is block diagram of a class-based scheduler using multiple queues.

Referring to FIG. 6, an arrangement 100 for placing an incoming frame 101 in an appropriate class queue based on its p-bits 24 is shown. The arrangement 100 includes four queues 102, 104, 106, and 108. The queues 102, 104, 106, and 108 are assigned different priorities for forwarding the frame based on the different levels of services defined in, e.g., the Ethernet differentiated service protocol. In this configuration, frames with p-bits mapped to E-EF differentiated service behaviors are placed in the highest priority queue 102. This queue does not allow frames to be discarded and all frames are of equal importance. In this example, queues 104 and 106 are allocated for forwarding frames with the assured service class of the differentiated services and frames are placed in this queue according to their p-bit assignment. In order to provide the level of service desired for assured services forwarding, each queue may be assigned a guaranteed minimum link bandwidth and frames are not re-ordered. However, if the network is congested the queues discard frames based on the assigned drop precedence. Queue 108 corresponds to a "best effort" queue. Frames placed in this queue are typically given a lower priority than frames in queues 102, 104, and 106. Queue 108 does not re-order the frames or allow for drop precedence differentiation.

While in the example above, an incoming frame was placed in one of four queues based on the p-bits 24; any number of queues could be used. For example, eight queues could provide placement of frames with each combination of p-bits 24 in a different queue.

In addition, the p-bits 24 can include congestion information in the forward and/or backward direction. This congestion information can be similar to forward explicit congestion notification (FECN) and backward explicit congestion notification (BECN) bits of the frame relay protocol. The congestion information signals a network device, for example, edge nodes or CEs, to throttle traffic until congestion abates. Out of the eight p-bit combinations, two combinations can be used for FECN (signaling congestion and no congestion), and two for the BECN direction.

In addition, the canonical format indicator (CFI), a one bit field in the Ethernet header, can be used for signaling congestion, or other QoS indicators such as frame drop precedence. The use of the CFI field in addition to (or in combination with) the p-bits 24 allows for support of additional PHBs. The p-bits can be used for signaling up to eight emission classes, and the CFI is used for drop precedence (two values), or a more flexible scheme, where the combined (p-bits+CFI) four bits can support 16 PHBs (instead of 8).

Referring to FIG. 7, an example of the assignment of p-bits 24 to represent nodal behaviors by mapping the p-bits 24 to combinations of the Ethernet differentiated service PHBs is shown. This assignment designates four groupings of nodal behaviors: E-EF, E-AF2, E-AF1, and E-DF. Each of the E-AF levels includes two drop precedence levels (i.e., E-AFX2 and E-AFX1) and thus, is assigned to two combinations of p-bits. The E-EF nodal behavior is mapped to the '111' combination 120 of p-bits, the E-AF2 nodal behaviors are mapped to the '110' and '101' combinations 122 and 124, the E-AF1 nodal behaviors are mapped to the '100' and '011' combinations 126 and 128, and the E-DF nodal behavior is mapped to the '010' combination 130. In this mapping of p-bits to nodal behaviors, two p-bits combinations 132 and 134 are reserved for congestion indication in the forward or backward direction.

For example, if the p-bits are assigned according to the mapping shown in FIG. 7 and the network includes a set of queues as shown in FIG. 6, frames can be routed to the appropriate queue based on the p-bit combination. Frames with a p-bit combination of '111' are placed in queue 102 and frames with a p-bit combination of '010' are placed in queue 108. Frames with either a '011' or '100' p-bit combination are placed in queue 106 and frames with either a '101' or '110' p-bit combination are placed in queue 106. If the network is congested (e.g., the queue is full), frames in queue 104 or 106 are dropped according to their drop precedence based on the p-bit combination. For example, a high drop precedence (e.g. AF22) frame is discarded before a low drop precedence frame (e.g. AF21) under congestion. In queue 106 frames with the E-AF12 designation are discarded before frames with the E-AF11 designation. Based on the p-bits, dropping frames having an E-AF12 designation before dropping frames having an E-AF11 designation corresponds to frames with a p-bit combination of '100' being dropped before frames with a p-bit combination of '011'.

The assignment of p-bits shown in FIG. 7 is only one possible assignment. Other service configurations and p-bit assignments are possible. For example, the assignment can include three levels of assured services (E-AF) each having two different assignments to define the drop precedence of the frames and two remaining combinations of p-bits for congestion indication. Alternately, four assured services with two drop precedents could be mapped to the eight combinations. In another example, four combinations could be dedicated to fully define congestion in the forward and backward directions. In this example, two p-bit combinations are dedicated to forward congestion (or lack of), two p-bit combinations are dedicated to backward congestion (or lack of), and the remaining four p-bit combinations are used to define the nodal behaviors. These four p-bit combinations could include one assured service with two drop precedence and two CS services, or two assured services each having two different assignments to define the drop precedence of the frames.

The edge node (at either customer or provider side) may perform IP differentiated services to Ethernet differentiated services mapping if the application traffic uses IP differentiated services. The mapping could be straightforward (e.g., IP-EF to E-EF, IP-AF to E-AF) if the number of IP PHBs used is limited to 8. Otherwise, some form of compression may be required to combine multiple IP PHBs into one E-PHB. Alternatively, multiple Ethernet connections (e.g., VLANs) can be used at the access and/or core, each supporting a subset of the required PHBs (e.g., VLAN-A supports E-EF/E-AF4/E-AF3, VLAN-B supports E-AF2/E-AF1/DF).

Typically, a class-based Queuing (CBQ) or a weighted fair queuing (WFQ) scheduler is used for forwarding frames on the egress link, at both edge and core nodes. The scheduling can be based on the PHB (subject to the constraints that some related PHBs such as an AFx group follow the same queue). The use of p-bits to indicate per-hop-behaviors allows for up to eight queues, or eight queue/drop precedence combinations.

Additional information may be available/acquired through configuration, signaling, or examining frame headers, and used for performing more advanced scheduling/resource management. Additional information can include, for example, service type, interface, or VID. For example, a 2-level hierarchical scheduler, where the first level allocates the link bandwidth among the VLANs, and the second level allocates the BW among the VLAN Differentiated services classes according to their PHB. Another example includes a 3-level hierarchical scheduler, where the first level allocates the link bandwidth among the service classes (e.g. business vs. residential), the second level allocates BW among the service VLANs, and the third level allocates the BW among the VLAN differentiated services classes according to their PHB.

The described Ethernet differentiated services architecture allows incremental deployment for supporting legacy equipment and network migration. Non-differentiated services capable nodes may forward all traffic as one class, which is equivalent to the E-DF class. Other 801.1Q nodes that use the p-bits simply to designate priority can interwork with Ethernet differentiated services nodes supporting the E-CS PHB. Some CoS degradation may occur under congestion in a network that uses a combination of E-differentiated services and legacy nodes.

Figure 8:
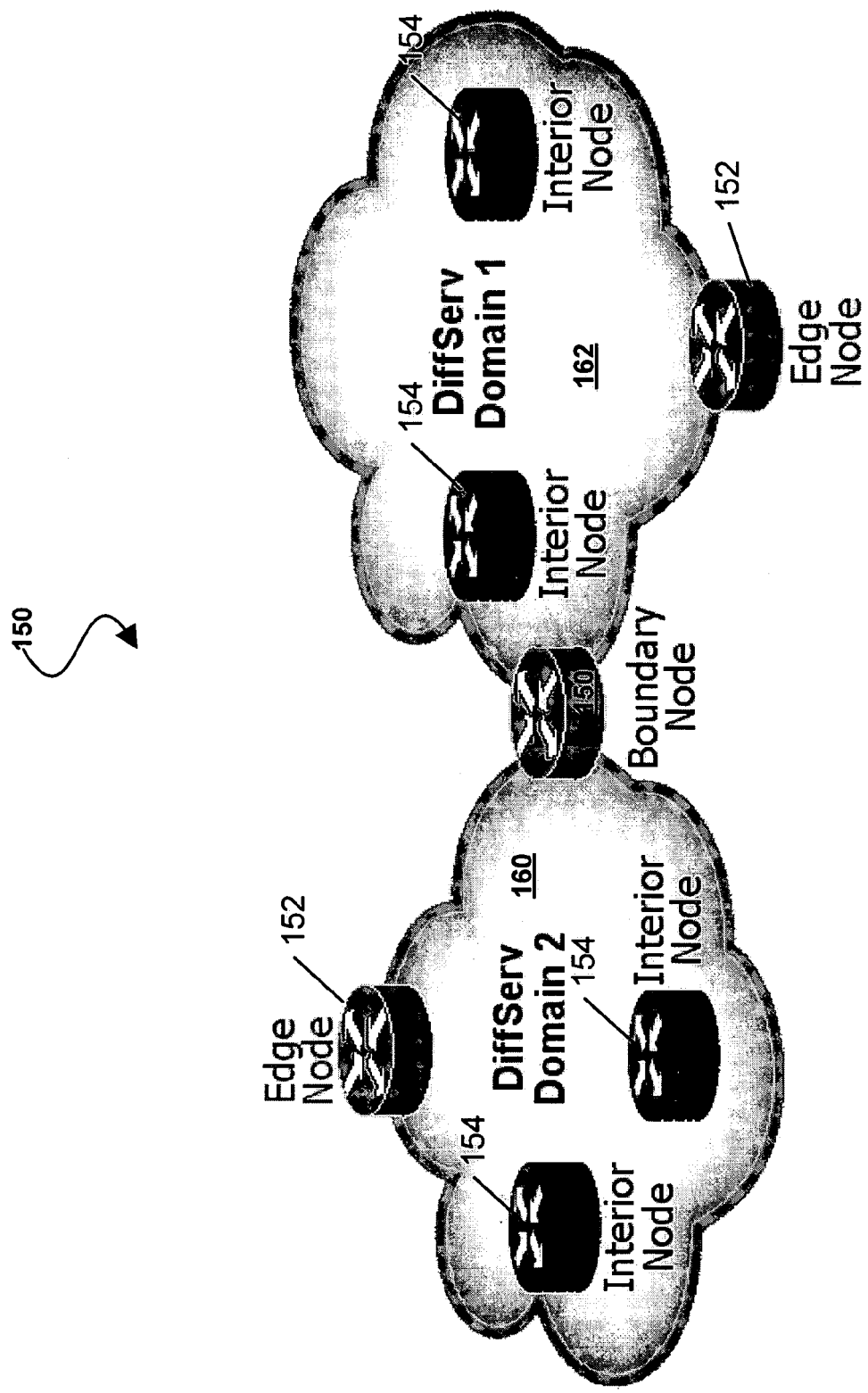
FIG. 8 is a block diagram of a differentiated services network having multiple domains.

Referring to FIG. 8, an Ethernet differentiated services network 150 having multiple domains 160 and 162 is shown. An Ethernet Differentiated services domain has a set of common QoS Policies, and may be part of an enterprise or provider network. The set of QoS policies can include Ethernet PHBs support, p-bits interpretation, etc. Edge nodes (e.g., nodes 152) interconnect sources external to a defined network (e.g. customer equipment). The Ethernet edge node 152 typically performs extensive conditioning functions. Interior Nodes 154 connect trusted sources in the same Differentiated services domain. Interior nodes 154 perform simple class-based forwarding. Boundary nodes 156 interconnect Differentiated services domains and may perform E-Differentiated services conditioning functions similar to edge nodes. This may include performing p-bit mapping, due to of different domain capabilities or policies.

Traffic streams may be classified, marked, and otherwise conditioned on either end of a boundary node. The service level agreement between the domains specifies which domain has responsibility for mapping traffic streams to behavior aggregates and conditioning those aggregates in conformance with the appropriate behavior. When frames are pre-marked and conditioned in the upstream domain, potentially fewer classification and traffic conditioning rules need to be supported in the downstream E-DS domain. In this circumstance, the downstream E-DS domain may re-mark or police the incoming behavior aggregates to enforce the service level agreements. However, more sophisticated services that are path-dependent or source-dependent may require MF classification in the downstream domain's ingress nodes. If an ingress node is connected to an upstream non-Ethernet differentiated services capable domain, the ingress node performs all necessary traffic conditioning functions on the incoming traffic.

Figure 9:
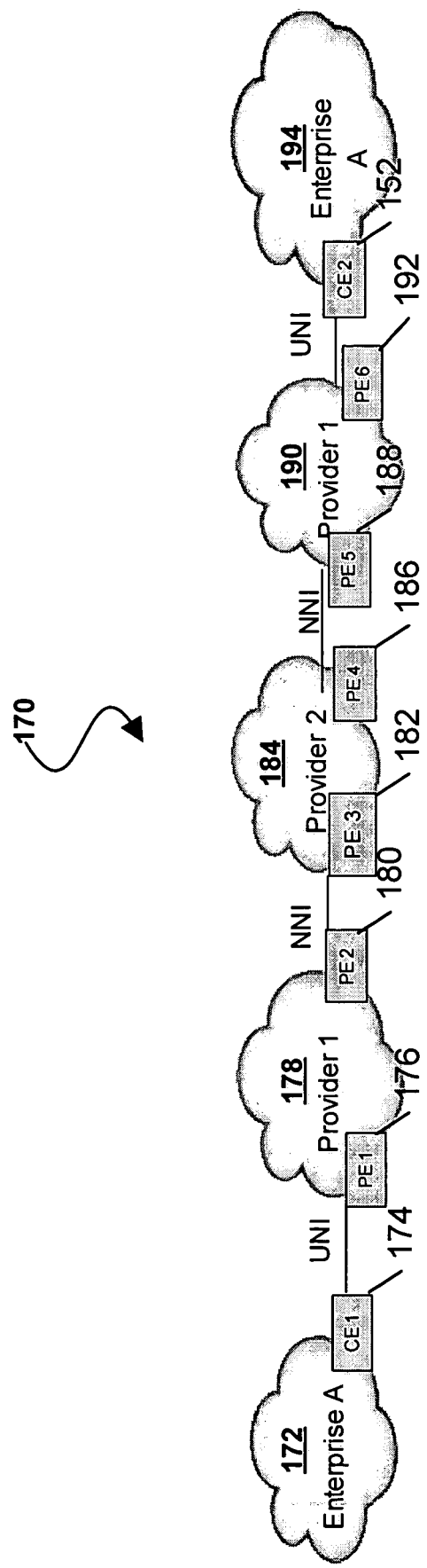
FIG. 9 is an architecture for end-to-end service across multiple provider networks.

Referring to FIG. 9, an example 170 for end-to-end service across multiple provider networks is shown. The example architecture shows the connection of two enterprise campuses, campus 172 and campus 194 through provider networks 178, 184, and 190. A user network interface (UNI) is used between the enterprise and provider edges and a network-network interface (NNI) is used between two providers. The end-to-end service level agreements are offered through bilateral agreements between the enterprise 172 and provider 178 and enterprise 194 and provider 190. Provider 178 has a separate SLA agreement with provider 184 and provider 190 has a separate SLA agreement with provider 184, to ensure that it can meet the enterprise end-to-end QoS. Three Ethernet differentiated services domains are shown: Enterprise A, Access Provider 1, and Backbone Provider 2. Each domain has its own set of Ethernet PHBs and service policies.

Although the basic architecture assumes that complex classification and traffic conditioning functions are located only in a network's ingress and egress boundary nodes, deployment of these functions in the interior of the network is not precluded. For example, more restrictive access policies may be enforced on a transoceanic link, requiring MF classification and traffic conditioning functionality in the upstream node on the link.

A number of embodiments of the invention have been described. Nevertheless, it will be understood that various modifications may be made without departing from the spirit and scope of the invention.

What is claimed is:

1. A network comprising;
    an edge node configured to define per-hop behaviors using a set of priority bits in a tag field of an Ethernet header of a frame; and
    a core node configured to receive the frame and to forward the frame according to the per-hop-behaviors as indicated in the set of priority bits; and
    core node including a behavior aggregate classifier device configured to receive the Ethernet frame and classify the frame based on a set of priority bits in a tag field of an L1-L7 Ethernet header, the classification including defining a per-hop behavior.

2. The network of claim 1 wherein the set of edge nodes is configured to provide conditioning of the frame.

3. The network of claim 1 wherein the set of edge nodes includes an ingress device and an egress device.

4. The network of claim 1 wherein the edge node includes a classifier device; and
    a marker device configured to mark the frame with a particular per-hop-behavior indicated in the priority bits.

5. The network of claim 4 wherein the edge node includes a shaper.

6. The network of claim 4 further comprising a meter.

7. The network of claim 4 wherein the edge node includes a dropper.

8. The network of claim 1 wherein the set of edge nodes is configured to add a tunnel header to the frame, the tunnel header indicating the per-hop behavior associated with the frame.

9. The network of claim 8 further configured to preserve the information in the original frame.

10. The network of claim 1 further comprising multiple Ethernet domains.

11. The network of claim 10 further comprising boundary nodes between the multiple Ethernet domains.

12. The network of claim 11 wherein the boundary nodes are configured to map the per-hop behavior of the frame between the multiple domains.

13. The network of claim 11 wherein the boundary nodes are configured to provide traffic conditioning for the frame.

14. A system comprising;
    a first Ethernet network, comprising
        an edge node configured to define per-hop behaviors using a set of priority bits in a tag field of an Ethernet header of a frame, and
        a core node configured to receive the frame and to forward the frame according to the per-hop-behaviors as indicated in the set of priority bits; and
    a second network comprising;
        a second edge device in the second network configured to determine the Ethernet per-hop behavior for the frame; and
        core node including a behavior aggregate classifier device configured to receive the Ethernet frame and classify the frame based on a set of priority bits in a tag field of an L1-L7 Ethernet header, the classification including defining a per-hop behavior.

15. The system of claim 14 including determining the frame per-hop behavior based on protocol information.

16. The system of claim 15 wherein the protocol information includes Ethernet port, VLAN-ID, IP DSCP or other L1-L7 protocol information.

17. The system of claim 15 further comprising a customer edge device configured to set the priority bits for the frame based on the frame per-hop behavior.

18. The system of claim 15 wherein the core nodes use a different network technology than the edge nodes.

19. The system of claim 18 wherein the different network technology includes at least one of asynchronous transfer mode, a multi-protocol label switching, a frame relay or an Internet protocol.

20. The system of claim 18 wherein the set of edge nodes is further configured to map the Ethernet per-hop behaviors to a set of bits in a frame according to the different network technology.

21. The system of claim 18 wherein the set of edge nodes is further configured to map the Ethernet per-hop behaviors to a set of connections in the core nodes.

22. The system of claim 18 further configured to preserve information in the frame.

23. The system of claim 18 wherein the set of edge nodes are further configured to encapsulate the frame for delivery on the core nodes.

24. The system of claim 23 further configured to tunnel the frame.

25. A networking device comprising:
    a behavior aggregate classifier device configured to receive an Ethernet frame and classify the frame based on a set of priority bits in a tag field of an L1-L7 Ethernet header, the classification including defining a per-hop behavior.

26. The networking device of claim 25 further configured to determine a bandwidth profile based on the classification.

27. The networking device of claim 25 further comprising a marker device configured to mark the frame header with a particular per-hop-behavior indication.

28. The networking device of claim 25 further comprising a shaper device configured to receive a frame from the marker and determine a behavior based on the per-hop behavior.

29. The networking device of claim 25 wherein the marker sets the priority bits in the frame to a particular combination.

30. The networking device of claim 29 further comprising a frame meter.

31. The networking device of claim 30 wherein the frame meter device is configured to determine temporal properties of a set of frames.

32. A method comprising;
configuring an edge node in an Ethernet network to define per-hop behavior using a set of priority bits in a tag field of an Ethernet header of an Ethernet frame; and
configuring a core node in the network to receive the frame and to forward the frame according to the per-hop behavior as indicated in the set of priority bits; and
core node including a behavior aggregate classifier device configured to receive the Ethernet frame and classify the frame based on a set of priority bits in a tag field of an L1-L7 Ethernet header, the classification including defining a per-hop behavior.

33. The method of claim 32 wherein the set of edge nodes is configured to condition the Ethernet frame.

34. The method of claim 32 wherein the set of edge nodes includes an ingress device and an egress device.

35. The method of claim 32 further comprising:
configuring the set of edge nodes to add a tunnel header to the frame, the tunnel header indicating the per-hop behavior associated with the frame.

36. The method of claim 32 further comprising:
configuring boundary nodes between multiple Ethernet domains to map the per-hop behavior of the Ethernet frame between the multiple domains.

37. The method of claim 32 wherein the Ethernet network is a first network the method further comprising:
configuring a second edge device in a second network to determine the Ethernet per-hop behavior for the frame.

38. The method of claim 37 further comprising:
determining the frame per-hop behavior based on protocol information.

39. The method of claim 38 wherein the protocol 2 information includes Ethernet port, VLAN-ID, IP DSCP or other L1-L7 protocol information.

* * * * *

UNITED STATES PATENT AND TRADEMARK OFFICE
CERTIFICATE OF CORRECTION

| | | |
|---|---|---|
| PATENT NO. | : 7,843,925 B2 | Page 1 of 1 |
| APPLICATION NO. | : 10/868607 | |
| DATED | : November 30, 2010 | |
| INVENTOR(S) | : Sameh Rabie et al. | |

It is certified that error appears in the above-identified patent and that said Letters Patent is hereby corrected as shown below:

In Column 14, line 16, Claim 39, delete "2".

Signed and Sealed this
Thirteenth Day of September, 2011

David J. Kappos
*Director of the United States Patent and Trademark Office*